March 26, 1940.     E. J. PATTERSON     2,195,381
BEAN VINE WINDROWER
Filed Oct. 28, 1938     3 Sheets-Sheet 2
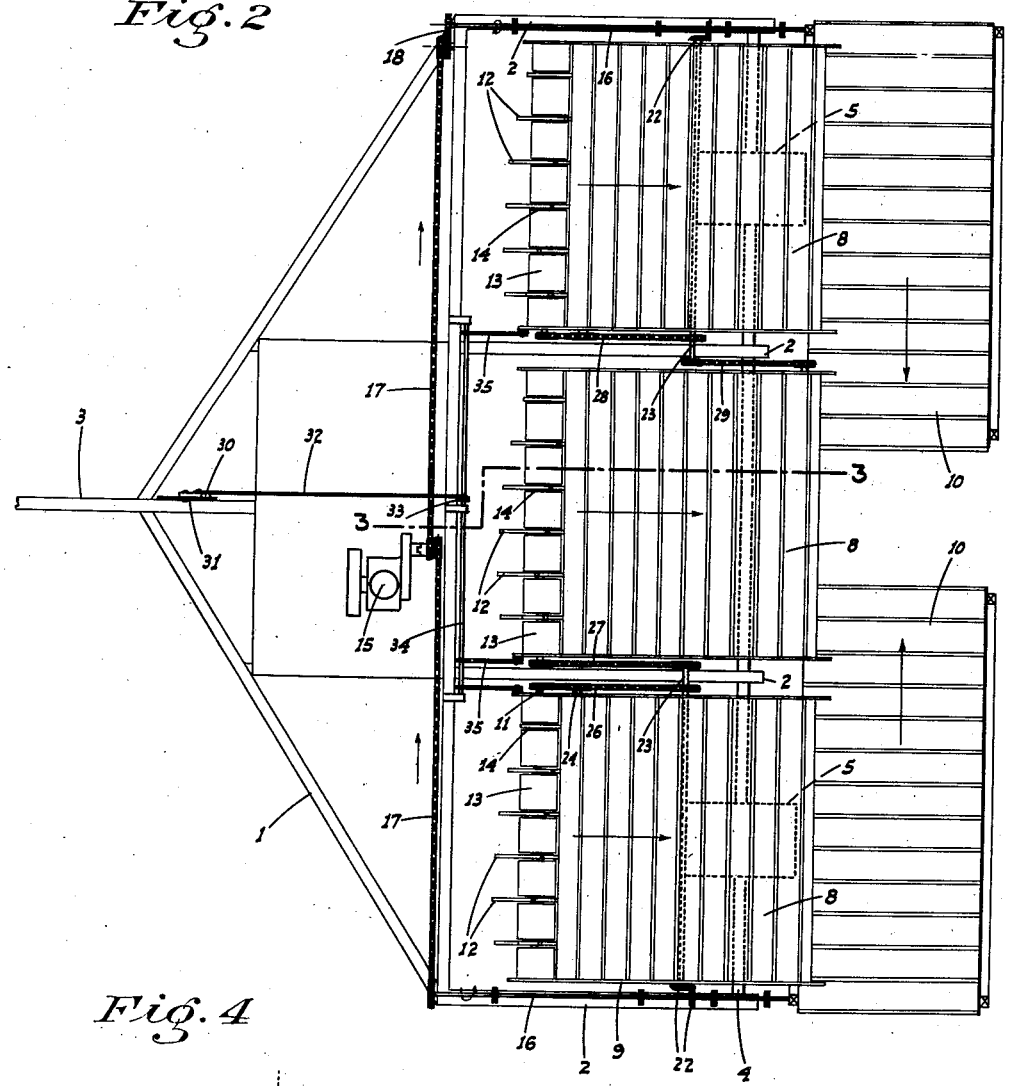
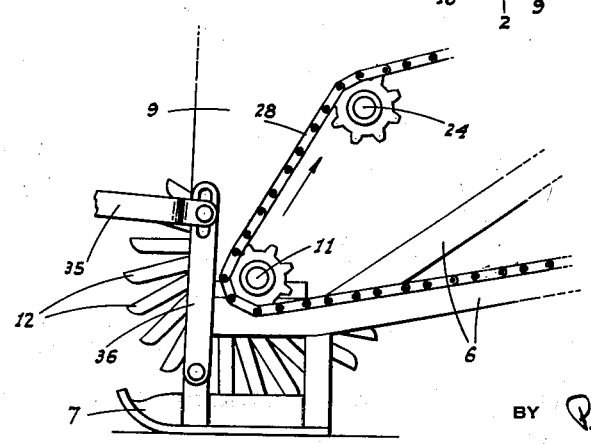
INVENTOR
E. J. Patterson
BY
ATTORNEY

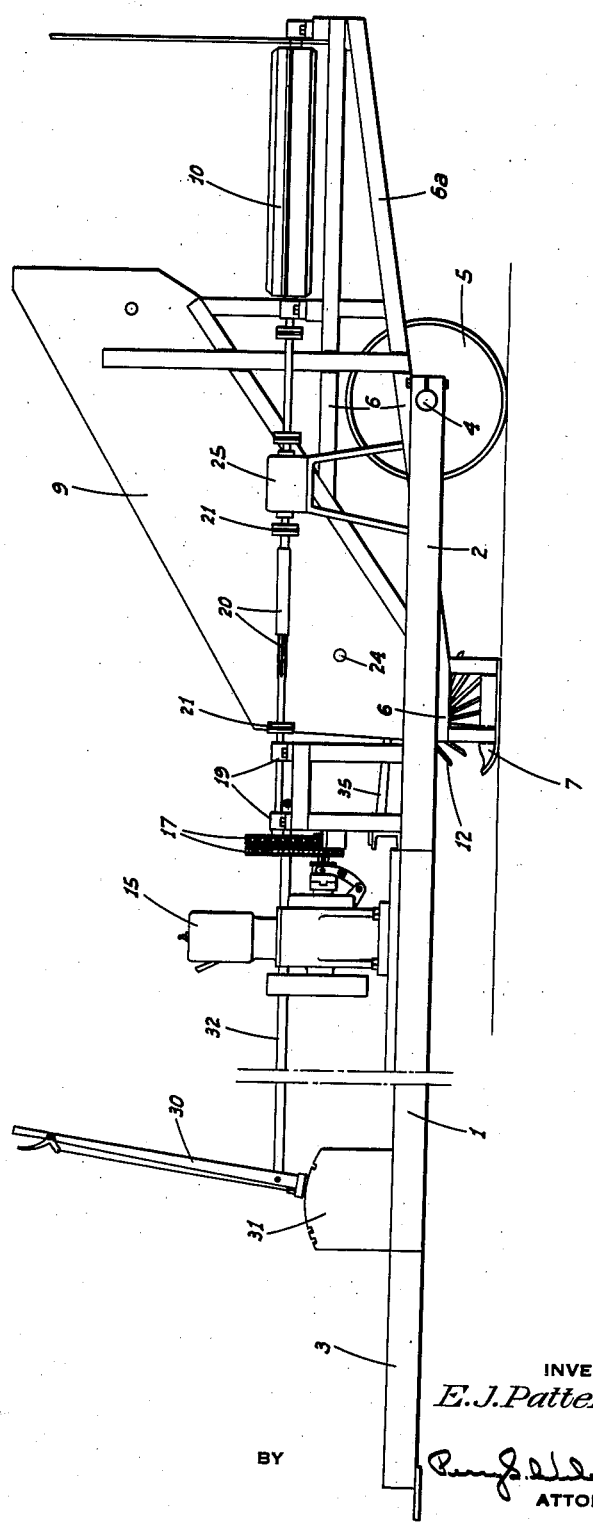

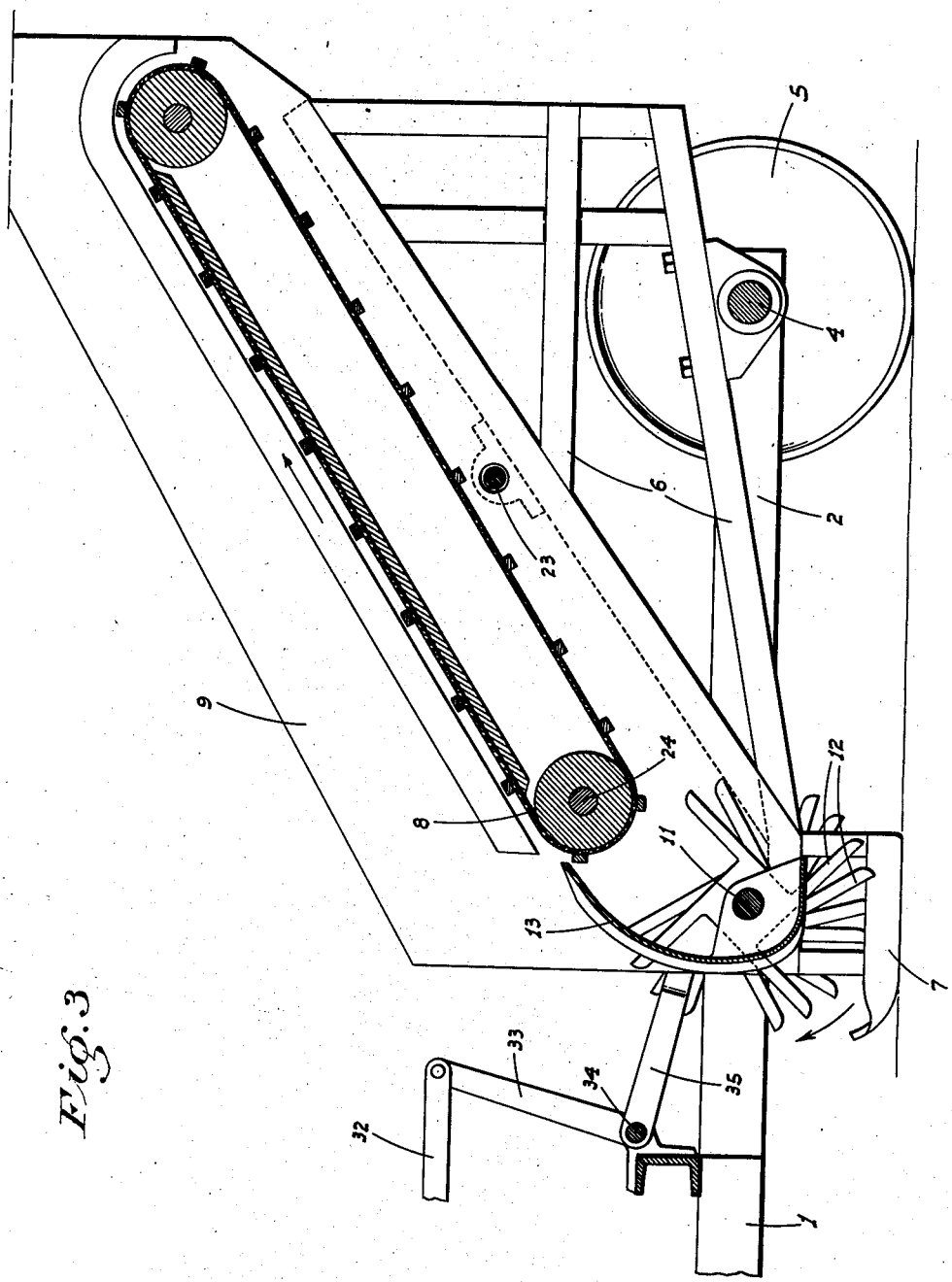

Patented Mar. 26, 1940

2,195,381

UNITED STATES PATENT OFFICE 2,195,381

BEAN VINE WINDROWER

Edie J. Patterson, Stockton, Calif., assignor of fifty per cent to Marti Bros., Tracy, Calif., a copartnership composed of Frank Marti and Pedro Marti Application October 28, 1938, Serial No. 237,499

13 Claims. (Cl. 56—344)

This invention relates to bean and pea harvesting and particularly to the treatment of the vines after they have been cut and prior to their delivery to the thresher.

In bean and pea harvesting, it is customary to cut the vines below ground level, two adjacent rows (or in pairs of two) at a time, and leave the vines on the ground as they are cut, in the form of relatively small windrows.

Since the feeding capacity of an ordinary thresher is considerably greater than one of such windrows, adjacent ones must also be gathered together and fed to the thresher at the same time if the thresher is to operate at maximum efficiency.

It is therefore the principal object of my invention to provide a machine which, with a single movement or travel along a field, will gather the cut vines from a number of the initial small windrows and form a single compact windrow therefrom. Harvesting and threshing operations generally are thus greatly facilitated and expedited over what is obtainable with the methods of procedure in vogue prior to my invention.

Since the machine operates simultaneously on a number of initial windrows (or pairs of original rows of vines), it is necessarily somewhat wide. A further object of my invention therefore is to so mount the various pick-up and elevator units of the machine that they may individually follow and conform to any irregularities in the transverse contour of the ground traversed by the machine, so that all said initial windrows will be acted on to the same extent and with equal efficiency.

As the vines are cut below ground level, some of them are apt to be covered by or mixed with clods or small rocks, which of course should not be fed into the thresher. With this in mind, another object of my invention is to provide a vine pick-up mechanism so constructed that the vines will be separated from any clods, etc., and the latter left behind, so that the vines when fed to the thresher will be in a clean condition.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views;

Figure 1 is a side elevation of the machine.

Figure 2 is a somewhat diagrammatic top plan view of the machine showing particularly the drive means for the various pick-ups, elevators and drapers.

Figure 3 is a fragmentary longitudinal section on line 3—3 of Fig. 3.

Figure 4 is a fragmentary side elevation of one of the pick-up and elevator units.

Referring now more particularly to the characters of reference on the drawings, the machine comprises a main frame 1 which includes four transversely and evenly spaced side beams 2 and a front end tongue 3 rigid therewith and adapted at its forward end for supporting connection with a tractor. The beams at their rear end support a heavy axle 4 on which two wheels 5 are mounted, these wheels being centrally disposed between the outermost pairs of beams 2, as indicated in Fig. 2.

Independently and turnably mounted on the axle 4 in the spaces between the beams 2 are the supporting frames 6 of the pick-up and elevator units. At their forward end, the frames are provided at the sides with ground engaging shoes 7, the weight of the units being balanced relative to the pivotal axle 4 so that the shoes ride but lightly on the ground.

Each unit incudes an endless elevator 8 of the conventional wide-belt cleated type disposed between upstanding side plates 9 and set with an upward slope from front to rear, the upper run of the elevator traveling rearwardly The central elevator discharges directly onto the ground and its frame 6 terminates adjacent the rear end of the elevator as shown in Fig. 3. The frames of the side elevators however extend rearwardly therefrom some distance as shown at 6a and support endless cross drapers 10 which terminate short of each other some distance as shown in Fig. 2 and receive from the corresponding elevators, the rear end of the latter being some distance above the drapers as shown. At the forward end of each frame 6, ahead of the corresponding elevator, a vine pick-up device is mounted. This comprises a cross shaft 11 extending between the side plates 9 ahead of and below the elevator and having a plurality of longitudinally spaced sets of circumferentially spaced fingers 12 fixed thereon. This pick-up device is disposed substantially in the plane of the shoes 7 lengthwise of the machine, and the length of the fingers is such that they clear the ground slightly when the shoes are riding on the ground.

The fingers of the different sets are set relative to each other so that they are staggered circumferentially as shown in Fig. 3, so that the pick-up strains on the supporting shaft and its driving mechanism are more evenly distributed. A fixed guard plate or shield unit 13, having slots 14 through which the fingers project, is mounted in connection with the elevator and pick-up unit. This is arranged so as to extend forwardly from the level of the upper run of the elevator, and then down and under in eccentric and approaching relation to the shaft 11. In this manner, the fingers below the guard, or those which are in depending relation to the shaft, are exposed for substantially their full length and become gradually covered by the guard as said fingers turn upwardly. The guard thus prevents the vines raked up by the fingers from being carried around, and instead are shifted onto the elevator as the machine advances, the fingers then in effect pulling down from and releasing their engagement with the vines. There is thus no possibility of the vines becoming entangled with the fingers and wrapped around the pick-up unit as a whole, the guard serving not only to guide the vines onto the elevator, but also as a wiper, to positively clean the fingers of vines as said fingers rotate.

The elevators and the machine as a whole are of a width such as to straddle a certain number of the initial vine windrows, and it will be seen that with the forward movement of the machine along and parallel to such windrows, they will all be gathered up and finally redischarged onto the ground in the form of a single windrow, disposed centrally of the width of the machine.

It will also be seen that on account of the individual swivel or pivotal mounting of the various pick-up and elevator units, each one may conform to ground irregularities regardless of the setting of the others or of the wheels, and without of course affecting in any way the desired formation of the single windrow.

The various elevators, pick-up units and drapers may be driven direct from the tractor, or I may mount a power plant such as a gas engine 15 on the frame 1 ahead of the elevators. In the arrangement shown, this engine is clutch-connected with longitudinally extending shaft units 16 at the sides of the machine by chain drives 17. The shaft units are directly connected to the outer ends of the cross drapers 10 as shown, and since the drives 17 both operate in the same direction whereas the cross drapers must travel in opposite directions, a reverse gearing arrangement 18 is interposed between one chain drive and the adjacent shaft unit 16. The direction of drive of the two drapers is of course such that their upper runs travel toward each other.

Each shaft unit is supported adjacent its forward end in bearing boxes 19 mounted on the main frame 1, whereas at its rear end it is supported on the relatively movable frame 6. Each shaft unit therefore includes a telescoping portion 20 and flexible couplings 21.

In order to transmit driving power to the pick-up units and elevators from the shaft units, each unit is connected by bevel gearing 22 with a cross shaft 23 parallel to the shaft 11 and the adjacent axial shafts 24 of the elevators. The gears are enclosed and supported in a box 25 mounted on the frame 6, and the shaft 23 is also mounted on said frame, projecting through to the inner side of the adjacent elevator. The inner end of one of the shafts 23 is connected by chain drives 26 and 27 with the shafts 11 and 23 of the adjacent side unit, and the pick-up shaft 11 of the central unit respectively. The inner end of the other shaft 23 is connected by chain drives 28 and 29 with the shafts 11 and 23 of the corresponding side unit, and an end shaft of the central elevator respectively, as shown in Fig. 2.

It may here be noted that while the central elevator unit moves relative to the drive shafts 23, the use of chains between said shafts and those of the central unit permits of the unavoidable but small differences in distances between said shafts had with relative swivel movement of the central unit without harm being taken up by a normal slack in the chains.

As previously indicated, the shoes 7 when the machine is in operation, ride freely on the ground so that the various elevator units can raise and lower without restraint. In order to positively raise the elevator units clear of the ground when desired, I provide a hand lever 30 mounted on the forward end of the frame and provided with a suitable holding pawl and quadrant device 31. This lever is suitably connected by a link and arm 32 and 33 respectively with a cross shaft 34 mounted on the frame 1 ahead of the elevators. Arms 35 project rearwardly from said shaft at the sides of the elevator units and are connected, with loose play, with upstanding links 36 mounted on the frames 6 at their forward end. In this manner the elevator units may rise or fall at their forward end without affecting the lever, while at the same time, sufficient movement of the latter will effect the lifting of all the elevator units so that the shoes clear the ground the necessary distance for transportation of the implement when not in use.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A vine windrower comprising a frame supported for movement along the ground, a plurality of separate vine pick-up and elevating units disposed in a transverse row and of a total width to act on a plurality of rows of vines simultaneously, means independently and pivotally mounting said units on the frame for independent vertical movement at their forward end, and a transverse draper structure positioned to receive from the elevator units and adapted to discharge onto the ground to form a single windrow and lifting means applied to all the units and operable to lift all said units at their front end clear of the ground simultaneously.

2. A pick-up and elevator unit for a vine windrower comprising a frame, means supporting the frame at its forward end from the ground, an upwardly sloping endless elevator belt mounted on the frame, a cross shaft mounted on the frame ahead of the elevator, a plurality of transversely spaced sets of circumferentially spaced fingers projecting from the shaft, said shaft being disposed relative to the adjacent end of the elevator so that the fingers clear the same and do not project materially above the plane of the upper surface of the elevator belt, a plate unit slotted for the passage of the fingers extending forwardly from and substantially in alinement with the forward end of the belt, and then down and under in eccentric and approaching relation to the shaft whereby the fingers when in depending relation are exposed for the major portion of their length below the plate unit, and means to drive the elevator and shaft in the same direction and so that the upper run of the belt moves rearwardly.

3. A structure as in claim 2 in which the fingers of each set are staggered circumferentially relative to the fingers of the adjacent sets.

4. A vine windrower comprising a frame supported for movement along the ground, a plurality of separate vine pick-up and elevating units disposed in a transverse row, means independently and pivotally mounting said units on the frame for independent vertical movement at their forward end and a transverse draper structure positioned to receive from the elevator units and to discharge onto the ground; the draper structure comprising separate drapers mounted in fixed connection with corresponding elevator units and disposed rearwardly of the point of pivotal mounting of the units whereby to aid in balancing said units relative to said pivotal point.

5. A vine windrower including a frame supported for movement along the ground, a vine pick-up and elevator arranged in the frame as a rigid unit, and sloping upwardly and rearwardly from adjacent the ground, a ground engaging element supporting the unit at its forward end and a cross shaft mounted on the frame and supporting the unit intermediate its ends.

6. An agricultural implement comprising a frame supported for movement along the ground, a pick-up and elevator structure, a cross draper mounted on the structure to form a rigid unit therewith and in position to receive from the elevator and means pivoting the unit on the frame for swinging movement in a vertical plane and at a point in the length of the unit so that the weight of the same is substantially balanced.

7. An agricultural implement comprising a frame adapted at its forward end for supporting connection with a draft device, a cross shaft mounted on the frame adjacent its rear end, ground engaging wheels on said shaft, and a pick-up, elevator and draper unit including a frame turnably mounted on the shaft and extending forwardly therefrom and a ground engaging element supporting the unit frame at its forward end.

8. An implement as in claim 7 in which the elevator extends upwardly over the wheels and the cross draper is disposed rearwardly of the wheels.

9. An implement as in claim 7 in which the weight of the unit is substantially balanced on the shaft.

10. A pick-up and elevator unit for a vine windrower comprising a frame, means supporting the frame at its forward end from the ground, an elevator belt mounted on the frame and sloping upwardly from its forward end, a cross shaft mounted on the frame ahead of the elevator, a plurality of transversely spaced sets of pick-up fingers projecting from the shaft, said shaft being disposed relative to the adjacent end of the elevator so that the fingers clear the same and do not project materially above the plane of the upper surface of the belt, means to drive the elevator and shaft in the same direction and so that the upper rim of the belt moves rearwardly and means to disengage vines picked up by the fingers as the latter approach their topmost position and dispose such vines in line with the upper run of the belt.

11. A structure as in claim 10, in which the fingers of each set are staggered circumferentially relative to the fingers of the adjacent sets.

12. A vine windrower comprising a frame supported for movement along the ground, a plurality of separate vine pick-up and elevator units disposed in the frame in a transverse row, means pivoting the units in common on the frame at a point rearwardly of their forward end and means applied to the units adjacent their forward end to lift all the units simultaneously and arranged to allow of independent vertical movement of the same when in operative position.

13. A structure as in claim 12 in which said last named means comprises a transverse shaft turnably mounted on the frame ahead of the units, rearwardly projecting arms on the shaft extending alongside the several units at their forward end and lost-motion connection means between the units and arms in depending relation to the latter.

EDIE J. PATTERSON.